(12) United States Patent
Warren et al.

(10) Patent No.: US 12,311,452 B2
(45) Date of Patent: May 27, 2025

(54) LONGITUDINAL PIPE CUTTING TOOL

(71) Applicant: Citizens Energy Management Company, LLC, Indianapolis, IN (US)

(72) Inventors: Benjamin S. Warren, Indianapolis, IN (US); Kaleb Edwards, Indianapolis, IN (US); Darrell Edwards, Indianapolis, IN (US)

(73) Assignee: Citizens Energy Management Company, LLC, Indianapolis, IN (US)

( * ) Notice: Subject to any disclaimer, the term of this patent is extended or adjusted under 35 U.S.C. 154(b) by 15 days.

(21) Appl. No.: 17/714,688

(22) Filed: Apr. 6, 2022

(65) Prior Publication Data

US 2023/0321736 A1 Oct. 12, 2023

(51) Int. Cl.
*B23D 21/02* (2006.01)

(52) U.S. Cl.
CPC .................... *B23D 21/02* (2013.01)

(58) Field of Classification Search
CPC ...... H02G 1/1217; H02G 1/126; B23D 21/02; B23D 29/007; B23D 35/007; H01B 15/006; Y10T 83/9403
USPC ....................... 81/9.4–9.43; 30/90.4, 92.5, 93
See application file for complete search history.

(56) References Cited

U.S. PATENT DOCUMENTS

| | | | | |
|---|---|---|---|---|
| 344,487 A | * | 6/1886 | Mahlon .................. | B23D 21/08 30/102 |
| 669,874 A | * | 3/1901 | Birchard et al. ....... | B23D 21/08 30/96 |
| 1,178,801 A | * | 4/1916 | Griffin ................... | B23D 21/02 30/92.5 |
| 1,866,095 A | * | 7/1932 | Foley .................... | H02G 1/1231 30/92 |
| 1,885,944 A | * | 11/1932 | Pedersen .............. | H02G 1/1229 81/9.42 |
| 1,968,857 A | * | 8/1934 | Shafer .................... | B23D 21/08 D8/60 |
| 2,288,670 A | * | 7/1942 | Babiary ............... | H02G 1/1229 30/95 |
| 2,293,754 A | * | 8/1942 | Ludke .................. | H02G 1/1268 30/142 |
| 2,324,323 A | * | 7/1943 | Reynolds ............... | B23D 21/08 30/92.5 |

(Continued)

FOREIGN PATENT DOCUMENTS

| | | | | |
|---|---|---|---|---|
| CA | 2354737 A1 | * | 2/2003 | ........... B21C 37/127 |
| GB | 190124695 A | * | 10/1902 | ............. B23D 21/02 |
| JP | 02059208 A | * | 2/1990 | ............. B23D 21/02 |

OTHER PUBLICATIONS

Harbor Freight, Pittsburgh, No. 2. Pipe Cutter, dated Dec. 7, 2021, pp. 1, URL: www.harborfreight.com.

*Primary Examiner* — Ghassem Alie
*Assistant Examiner* — Samuel A Davies
(74) *Attorney, Agent, or Firm* — Crowell & Moring LLP (57) ABSTRACT

A longitudinal pipe cutting tool includes a holder having a cutting wheel rotatable in a cutting plane along a longitudinal direction of a work piece. The longitudinal pipe cutting tool also including an actuator configured to move at least one of the holder or the work piece toward each other or away from each other, and a body coupled with the actuator. The body also slideable coupled with the holder such that the holder extends away from the body transverse to the longitudinal direction of the work piece and the cutting plane.

13 Claims, 5 Drawing Sheets

(56) References Cited

U.S. PATENT DOCUMENTS

| | | | | |
|---|---|---|---|---|
| 2,325,353 A * | 7/1943 | Wright | ............... | B23D 21/08 |
| | | | | D8/60 |
| 2,346,227 A * | 4/1944 | Martin | ............... | H01B 15/006 |
| | | | | 30/90.9 |
| 2,429,611 A * | 10/1947 | Churnell | ............... | H01B 7/36 |
| | | | | 83/676 |
| 2,434,640 A * | 1/1948 | Burdwood | ............... | H01B 15/006 |
| | | | | 83/425.3 |
| 2,456,882 A * | 12/1948 | Mackey | ............... | H02G 1/1229 |
| | | | | 30/91.2 |
| 2,648,899 A * | 8/1953 | Beyer | ............... | H02G 1/1217 |
| | | | | 30/90.9 |
| 3,044,170 A * | 7/1962 | Agombar | ............... | H02G 1/1202 |
| | | | | 30/90.9 |
| 3,197,865 A * | 8/1965 | Bourdier | ............... | H02G 1/1229 |
| | | | | 81/335 |
| 3,316,781 A * | 5/1967 | Bignell | ............... | H01B 7/36 |
| | | | | 83/924 |
| 3,462,052 A * | 8/1969 | Wagner | ............... | H01B 7/36 |
| | | | | 225/2 |
| 3,613,236 A * | 10/1971 | Lauck | ............... | B23D 21/08 |
| | | | | 83/487 |
| 3,631,748 A * | 1/1972 | Kuts | ............... | B21F 13/00 |
| | | | | 83/924 |
| 3,640,181 A | 2/1972 | Whitfill, Jr. | | |
| 3,817,132 A * | 6/1974 | Emery | ............... | H01B 15/005 |
| | | | | 83/924 |
| 3,866,501 A * | 2/1975 | Glendenning | ............... | B23D 21/02 |
| | | | | 83/519 |
| 3,946,487 A * | 3/1976 | Bieganski | ............... | H02G 1/1231 |
| | | | | 30/91.2 |
| 4,962,918 A * | 10/1990 | Yang | ............... | B25H 1/10 |
| | | | | 269/208 |
| 5,809,652 A * | 9/1998 | Ducret | ............... | H02G 1/1231 |
| | | | | 30/90.9 |
| 5,893,553 A * | 4/1999 | Pinkous | ............... | B25B 5/101 |
| | | | | 29/257 |
| 5,979,286 A * | 11/1999 | Burth | ............... | H01B 15/006 |
| | | | | 83/947 |
| 5,988,018 A * | 11/1999 | Tolbert | ............... | H01B 15/006 |
| | | | | 81/9.41 |
| 6,378,212 B1 * | 4/2002 | Belew | ............... | B23D 21/02 |
| | | | | 30/101 |
| 8,033,024 B2 * | 10/2011 | Goop | ............... | B23D 21/04 |
| | | | | 30/93 |
| 9,153,364 B2 * | 10/2015 | Parker | ............... | H01B 15/006 |
| 9,608,416 B2 * | 3/2017 | Zhang | ............... | H02G 1/1221 |
| 2012/0192696 A1 * | 8/2012 | Barrett | ............... | H02G 1/1229 |
| | | | | 83/881 |

* cited by examiner

LONGITUDINAL PIPE CUTTING TOOL

BACKGROUND

1. Technical Field

This application relates to pipe cutting tools and, more particularly, to a longitudinal pipe cutting tool.

2. Related Art

Pipes are used to carry liquid and/or gas. Routing of pipes may be above or below ground. During installation, pipes are cut to various lengths to fit the designated route. Pipes of relatively small diameter may be cut to a desired length using a pipe cutter tool. Such pipe cutter tools are effective at cleanly cutting a pipe in a cross-sectional direction without creating burrs on the pipe at the cutting site.

SUMMARY

A longitudinal pipe cutting tool may be used to cut a workpiece such as a pipe along a length of the pipe. The longitudinal pipe cutting tool includes a main body having a first arm, a second arm and a rail extending transversely between the first arm and the second arm such that the first arm and the second arm are aligned and extend away from the rail in a same direction at opposite ends of the rail. The longitudinal pipe cutting tool may also include a holder movably mounted on the rail to move along the rail between the first arm and the second arm. The holder may include a plurality of blades mounted in the holder on respective pins coupled with the holder, the blades rotatable around the respective pins in a direction perpendicular to the direction the first arm and the second arm extend away from the rail.

An interesting feature of longitudinal cutting tool relates to the holder being a first blade holder and the longitudinal pipe cutting tool including a second holder engaged with a work piece longitudinally extending away from the second holder. The second holder being positioned such that the blades mounted in the first blade holder are aligned with and extend toward the second holder, and a direction of rotation of the blades is along the work piece longitudinally extending away from the second holder. In an example, the second holder is a stationary holder fixedly mounted on the first arm or the second arm or fixedly mounted on the rail between the first holder movably mounted on the rail and one of the first arm or the second arm. In another example, the second holder includes a plurality of blades mounted in the second holder on respective pins coupled with the second holder. In this example, the blades are rotatable around the respective pins in a direction perpendicular to the first arm and the second arm, and are aligned in parallel with the blades mounted in the first holder.

In another example, the longitudinal pipe cutting tool includes a cutting wheel rotatably disposed in a holder to rotate around a pin, and a body comprising a rail, a first member and a second member. The holder may be coupled with the rail and disposed between the first member and the second member. The holder may be slidable on the rail between the first member and the second member to contiguously contact a work piece with the cutting wheel. The work piece may have a length and a width. The length of the work piece longitudinally extending perpendicular to the pin such that the cutting wheel is rotatable along the length of the work piece.

Another interesting feature of the longitudinal pipe cutting tool relates to an actuator coupled with one of the first member or the second member and the holder, and an alignment support coupled with the rail and extending parallel to the pin to contiguously contact and align the work piece with the cutting wheel.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
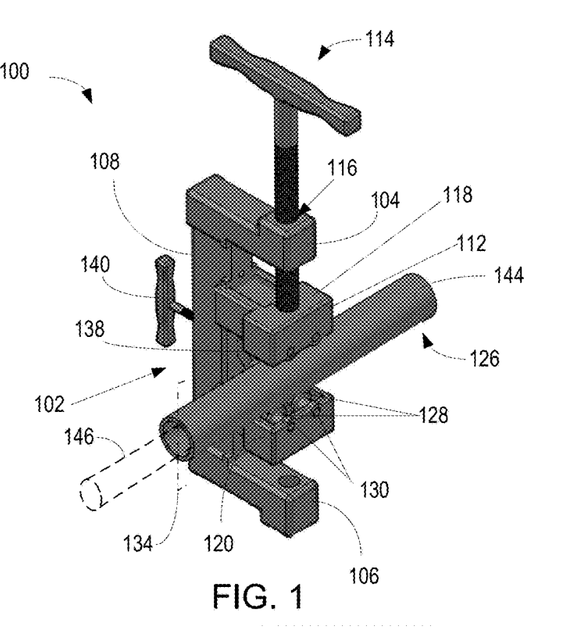
FIG. 1 illustrates an example of a longitudinal pipe cutting tool.

FIG. 1 illustrates an example of a longitudinal pipe cutting tool 100. The pipe cutting system 100 of this example includes a main body 102 having a first arm 104, a second arm 106, and a rail 108 extending transversely between the first arm 106 and the second arm 108. The body 102 may be made of metal or some other rigid material, and may be a monolithic single part, or multiple discrete parts fastened together, such as by welding, gluing, and/or fasteners, such as bolts or screws. The first arm 104 and the second arm 106 may be aligned with each other to extend away from the rail in a same direction at opposite ends of the rail 108. The first and second arms 104 and 106 may be aligned in parallel at opposite ends of the rail 108.

The pipe cutting tool 100 may also include a holder 112 movably mounted on the rail 108 to move along the rail between the first arm 104 and the second arm 106. The holder 112 may also be referred to herein as a first holder or a first blade holder. In the illustrated example of FIG. 1, the holder 112 is a first blade holder 112 that includes a cutting wheel rotatable in a cutting plane along a longitudinal direction of a work piece 126, such as a pipe. The holder 112 may be made of metal or some other rigid material. Movement of the position of the holder 112 on the rail 108 may be controlled by an actuator 114 coupled with the holder 112 and the first arm 106.

The actuator 114 may be coupled to the first arm 104 and abut the holder 112 to movably hold the holder 112 in a stationary position on the rail 108. In the illustrated example, the actuator 114 is a threaded t-handle that is rotatably engaged with threads formed in an arm aperture 116 provided in the first arm 104, and is rotatably coupled with a slot 118 include on the blade holder 112. In other examples, the actuator 114 may be electrically operated, such as with a stepper or servo motor or hydraulically actuated, such as with a piston and cylinder. In addition, other couplings may be used to rotatably couple the actuator 114 with the first blade holder 114. The body 102 is coupled with the actuator 114. In addition, the body 102 is slideable coupled with the holder 112 such that the holder 112 extends away from the body transverse to the longitudinal direction of the work piece 126 and a cutting plane created by the blade(s) along the length of the work piece 126.

The pipe cutting tool 100 may also include another holder 120. The another holder 120 may also be referred to herein as a second holder or a second blade holder. The second holder 120 may be positioned to be aligned with the first holder 112. A workpiece 126, such as a pipe, may be positioned between the first holder 112 and the second holder 120. The second holder 120 may engage with and hold the workpiece 126 in alignment with the first holder 112. The second holder 120 may be fixedly mounted on the rail 108, the second arm 106, or both. In some examples, where the second holder 120 is fixedly mounted to the rail 108, the second arm 106 may be omitted. In this example, the second holder is configured to receive and hold the work piece 126 in position with respect to a blade(s) included in the first holder 112. In an example, the blade(s) in the first holder 112 include rotatable cutting wheel(s). In this example, the work piece 126 may be held in alignment longitudinally by the second holder 120, such that rotation of the cutting wheel(s) in the first holder 112 progresses the first holder 112 along the work piece 126 while the cutting wheel(s) remaining aligned in the cutting plane 134 by the second holder 120.

In the illustrated example of FIG. 1, the second holder 120 is a second blade holder 120. The second blade holder 120 may be fixedly mounted on the rail 108, the second arm 106, or both so as to align with the first holder 112. Alternatively, as illustrated in FIG. 1, the second blade holder 120 may be movably mounted on the rail 108. Similar to the first holder 112, in this example configuration the second blade holder 120 may be actuated by an actuator (not shown) that is coupled with the second arm 106. For example, the actuator may be threadedly coupled with the second arm 106 and rotatably coupled with the second blade holder 120. Accordingly, the first and second blade holders 112 and 120 may be independently actuated to move towards or away from each other. In other examples, the second blade holder 120 may be fixedly mounted on the second arm 106, such that the second blade holder 120 is not moveable, and therefore no actuator is needed for the second blade holder 120. In this example, the first holder 112 may be moved toward and away from the second blade holder 120 using the actuator 114.

Figure 2:
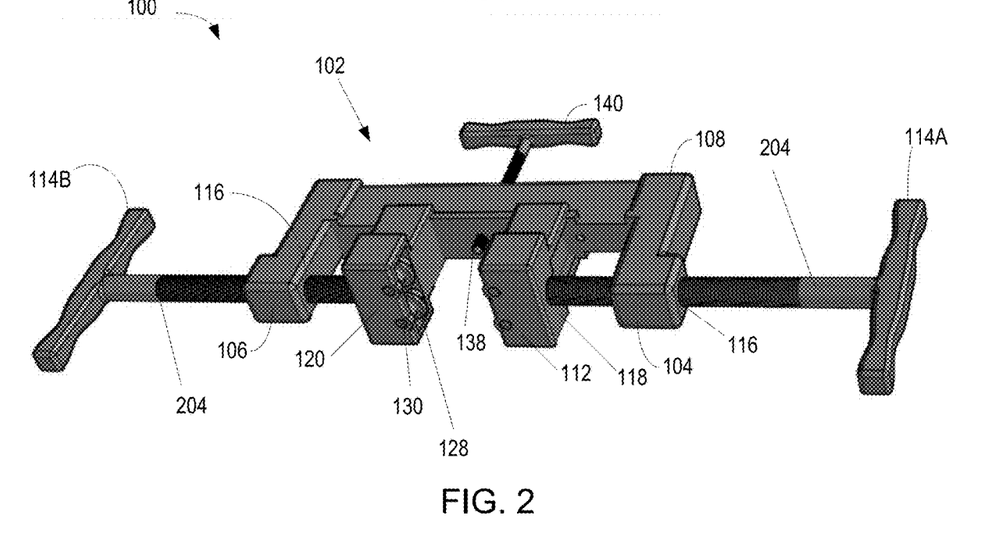
FIG. 2 illustrates a perspective view of an example of the longitudinal cutting tool.

The first and second blade holders 112 and 120 may be a housing in which one or more blades 128 are mounted. The blades 128 may be mounted in the first and second blade holders 112 and 120, for example, on respective pins 130 coupled with the respective first and second blade holders 112 and 120. In this example, the blades 128 are rotatable around the respective pins 130 in a direction perpendicular to the direction the first arm 104 and the second arm 106 extend away from the rail 108. In other examples, the blades 128 may be mounted in the first and second blade holders 112 and 120 by a spindle, axle or some other form of rigid member upon which the blades 128 may rotate. The pins 130 may be coupled with the respective first and second blade holders 112 and 120 by being placed in apertures and being securely held by removeable fasteners, such as threaded screws, that screw into an end of the pins 130, as illustrated in FIG. 2. In other examples, the pins may be press fit, friction fit or otherwise fixedly mounted on the respective first and second blade holders 112 and 120

In example configurations, the second holder 120 may be positioned such that the blades 128 mounted in the first holder 112 are aligned with and extend toward the second holder 120. In other example configurations, where the second holder 120 includes blades 128, the blades 128 mounted in the second blade holder 120 are aligned in parallel with the blades 128 mounted in the first holder 112. In the example configuration of FIG. 1, the first holder 112 and the second blade holder 120 are movably mounted on the rail 108 such that the blades 128 mounted in the first holder 112 are aligned parallel with the blades 128 mounted in the second blade holder 120 to form a cutting plane 134. In the illustrated example, the blades 128 of the second holder 120 include a cutting wheel facing a cutting wheel of the first holder 112 such that the cutting wheel of the first holder 112 and the cutting wheel of the second holder 120 cut opposite sides of the work piece in the cutting plane 134. In addition, a first one of the actuators 114 may be rotatably coupled to the first arm 104 to abut the first blade holder 112 opposite the blades 128 to movably hold the first blade holder 112 in a stationary position on the rail 108. Similarly, a second one of the actuators 114 may be rotatably coupled to the first arm 104 to abut the first blade holder 112 opposite the blades 128 to movably hold the first blade holder 112 in a stationary position on the rail 108

The cutting tool 100 may also include an alignment support 138. The cutting plane 134 may be aligned with the workpiece 126, such as a pipe, using the alignment support 138. The alignment support 138 may include an alignment actuator 140. The alignment actuator 140 may move the alignment support 138 away from and toward the rail 108. The alignment support 138 may abut and be contiguously aligned with the work piece 126 such that the alignment support 138 may adjust the distance of the workpiece 126 from the rail 108. The cutting plane 134 may be parallel to the rail 108 and positioned a fixed predetermined distance from the rail 108 as determined by the first and second blade holders 112 and 120. The alignment support 138 is coupled with the body 102 by the alignment actuator 140 being threaded through the rail 108 and being rotatably coupled with the alignment cradle 138. In addition to the alignment support 138 abutting the work piece, the alignment support 138 may also align the work piece 126 with respect to the blade(s) 128. In addition, the alignment support 138 is movable by the alignment actuator 140 to adjust the cutting plane 134. Movement of the alignment actuator 140 may be manual via a handle as illustrated, or may be via an electric or pneumatic actuator, such as a motor or solenoid.

The cutting tool 100 may be used to cut the workpiece 126, such as a pipe, longitudinally along the length of the pipe. This is in sharp contrast to cutting a pipe circumferentially or cross sectionally. In an example, the work piece 128 may be a first pipe 144 having a first diameter with a second pipe 146, such as an internal pipe, having a second diameter smaller than the first diameter positioned inside the first pipe 126. For example, the first pipe 144 may be a protective outer pipe made of steel or some other rigid material that is surrounding and protecting the second pipe 146, such as a plastic pipe that is positioned in the first pipe 144. When access to the second pipe 146, for purposes of, for example, maintenance or repair is desired, removal of the second pipe 146 from the first pipe 144 is warranted.

Where the first and second pipes are buried or otherwise only partially accessible, instead of removing the second pipe 146 from the first pipe 144, it is desirable to access a portion of length of the second pipe 146 by removing a corresponding length of the surrounding first pipe 144. Removal of the corresponding length of the surrounding first pipe 144 may be performed using the cutting tool 100 without damage to the internal second pipe 146. Accordingly, the outer first pipe 144 may be cut with the cutting tool 100, while the internal second pipe 146, which still contains fluid, such as natural gas, water, steam, or some other fluid, is not compromised. Once the exterior first pipe 144 is cut and removed, maintenance may be performed on the inner second pipe 146.

Where the cutting tool 100 includes blades in only the first blade holder 112, the work piece 126 may be cut by the blades 128 on the side of the work piece 126, such as first (outer) pipe 144, facing the first blade holder 112 along cutting plane 134. During operation, the cutting tool 100 may be positioned on the outer pipe 144 as shown in FIG. 1, and the actuator 114 may be operated to move the blades 128 of the first blade holder 112 into contact with the first (outer) pipe 144. The cutting tool 100 may then be slide along the outside of the work piece 126. Sliding the cutting tool 100 along the length of the workpiece with the blades in contiguous contact causes the blades 128 to rotate around the pins 130. Since the blades 128 of the first blade holder 112 are engaged with the first pipe 144, a cut is made in the first pipe 144 along the cutting plane 134. By sequentially actuating the first blade holder 112 closer to the workpiece 126 and sliding the cutting tool back and forth along the work piece 126, the cut in workpiece 126 becomes deeper and deeper until the blades 128 cut through the first pipe 144.

In the example of the pipe cutting tool 100 including blades in both the first blade holder 112 and the second blade holder 120, the work piece 126 may be cut at the cutting plane 134 on opposite sides by the blades 128 in the respective first blade holder 112 and second blade holder 120. The respective actuators 114 may be sequentially tightened, such as in an alternating fashion, before or after the cutting tool 100 is slid along the length of the work piece 126. Once the blades in the respective holders 112 and 120 are advanced far enough towards one another and into the first pipe 144, the first pipe 144 may be cut through, without disturbing or harming the second (interior) pipe 146. The positioning of the cutting plane 134 on the work piece 126 may be controlled by actuation of the alignment support 138 to move the work piece 126 closer or further away from the rail 108. During sliding of the cutting tool 100 along the length of the work piece 100, the alignment support 138 may maintain the location of the cutting plane 138. In example, the pipe cutting tool 100 may be used on first (outer) pipes 144 with diameters of 5 cm (2") or less, and the longitudinal cut in the first pipe 112 may be 61 cm (24") or less.

FIG. 2 illustrates a perspective view of another example of the cutting tool 100. In FIG. 2, the workpiece is omitted and the cutting tool 100 is rotated, such that the alignment support 138 may be oriented on top of the workpiece and the first and second blade holders 112 and 120 may be positioned on opposing sides of a workpiece 126 (FIG. 1) abutting the alignment support 138. In this position, the workpiece 126, such as a pipe, may be cut on one side or on opposite sides by the blades 128 in the first blade holder 112 or the second holder 120. As illustrated in FIGS. 1 and 2, the alignment actuator 140 may be a threaded t-handle that is manually rotated to move the alignment support 138 with respect to the rail 108. Further, in this example, the alignment support 138 may be a foot positioned opposite the handle of the alignment actuator 140. The foot may be a separate part, or may be an integral part of the alignment actuator 140. In other examples, the alignment actuator 140 may be an electrical or hydraulic prime mover to adjust the position of the alignment support 138.

In FIG. 2, the first and second blade holders 112 and 120 may be independently adjusted using the actuator 114. In this example, a first actuator 114A having a handle 202A may be manually actuated to adjust the first blade holder 112, and a second actuator 114B having a handle 202B may be manually actutated to adjust the blade holder 120. In FIG. 2, the actuators 114A and 114B are threaded rods 204 extending from respective handles 202. The apertures 116 in the first blade holder 112 and the second blade holder 120 may similarly be threaded such that the actuators 114A and 114B may be independently rotated clockwise and counterclockwise to move the first and second blade holders 112 and 120 toward, or away from each other, as needed. In other examples, independently controlled actuation, or synchronized actuation are possible manually, with pneumatic actuators and/or with electric motor actuators.

Figure 3:
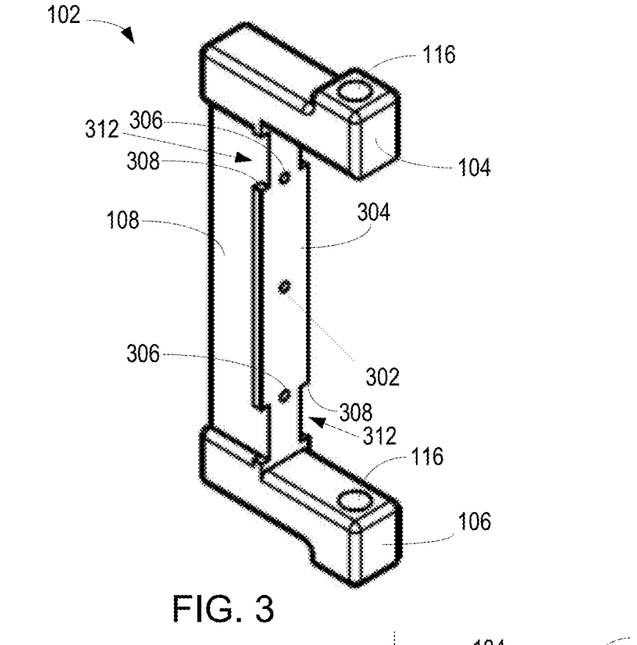
FIG. 3 is a perspective view of an example body of the longitudinal cutting tool.

FIG. 3 is a perspective view of an example body 102 of the cutting tool 100. As shown in FIG. 3, the first arm 104, the rail 108 and the second arm 106 form the body 102 as a "C" shaped member. The rail 108 of the body 102 in this example includes a threaded aperture 302. The threaded aperture 302 may receive the alignment actuator 140 outside the "C" shape such that the alignment support 138 is positioned within the "C" shape between, and aligned with the first and second arms 104 and 106. As also illustrated in FIG. 3, the first and second arms 104 and 106 may include the threaded arm apertures 116, which are sized to receive respective actuators 114.

Figure 4:
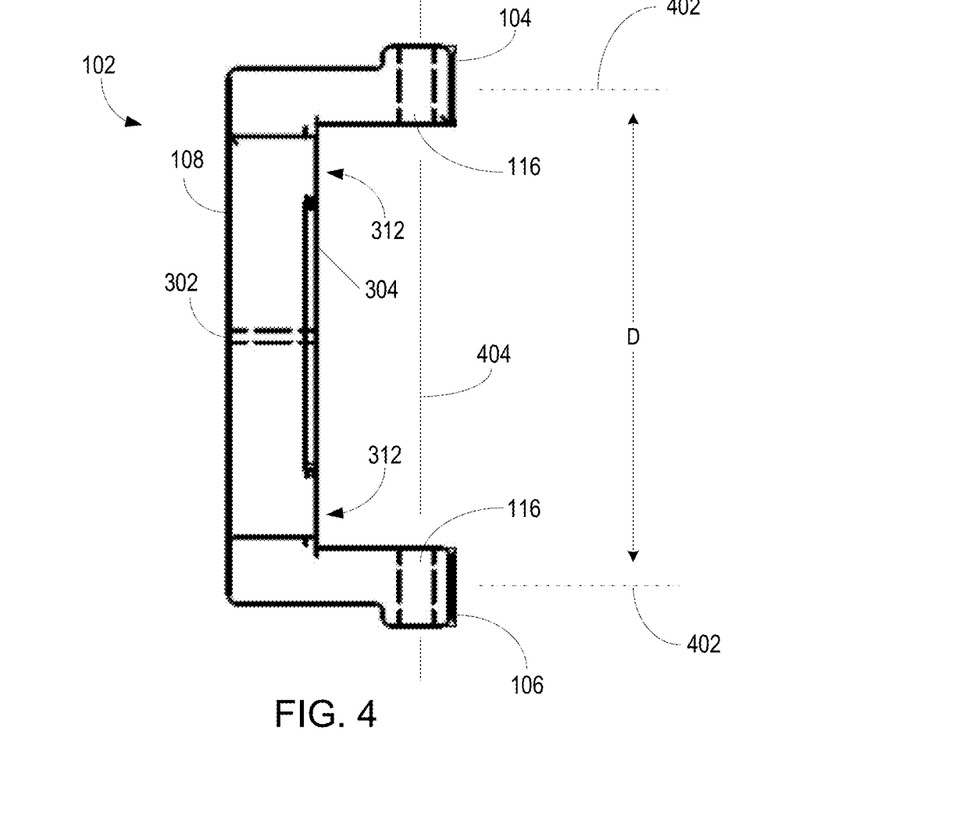
FIG. 4 is a side view of the body of FIG. 3

FIG. 4 is a side view of the body 102 of FIG. 3. Referring to FIGS. 3 and 4, the first and second arms 104 and 106 extend away from the rail in a same direction in parallel planes with a predetermined distance (D) therebetween as illustrated by dotted lines 402. Due to the parallel alignment of the first and second arms 104 and 106 at opposite ends of the rail 108, the respective threaded apertures 116 are coaxially aligned. In FIG. 4, the threaded aperture 302 extends through the rail 108, and the arm apertures 116 extend through the first and second arms 104 and 106 and are coaxially aligned as illustrated by centerline 404.

The body 102 may also include a slide plate 304 through which the threaded aperture 302 extends. The slide plate 304 may be mounted on the rail 108 by fasteners 306 that fixedly couple the slide plate 304 to the rail 108. In addition, the fasteners 306 may extend away from the slide plate 304 so as to operate as stops for impeding further travel along the slide of the first blade holder 112. In other examples, the slide plate 304 may be formed as part of a monolithic structure that includes the rail 108 and the slide plate 304. The slide plate 304 may be positioned on the rail to provide a lip 308 from portions of the slide plate 304 on opposite sides of the rail 108. The lip 308 may be created by opposing perimeter edges of the slide plate 304 extending beyond edges of the rail 108 on the opposite sides of the rail 108. The first blade holder 112 may be slideably mounted on the slide plate 304.

Figure 5:
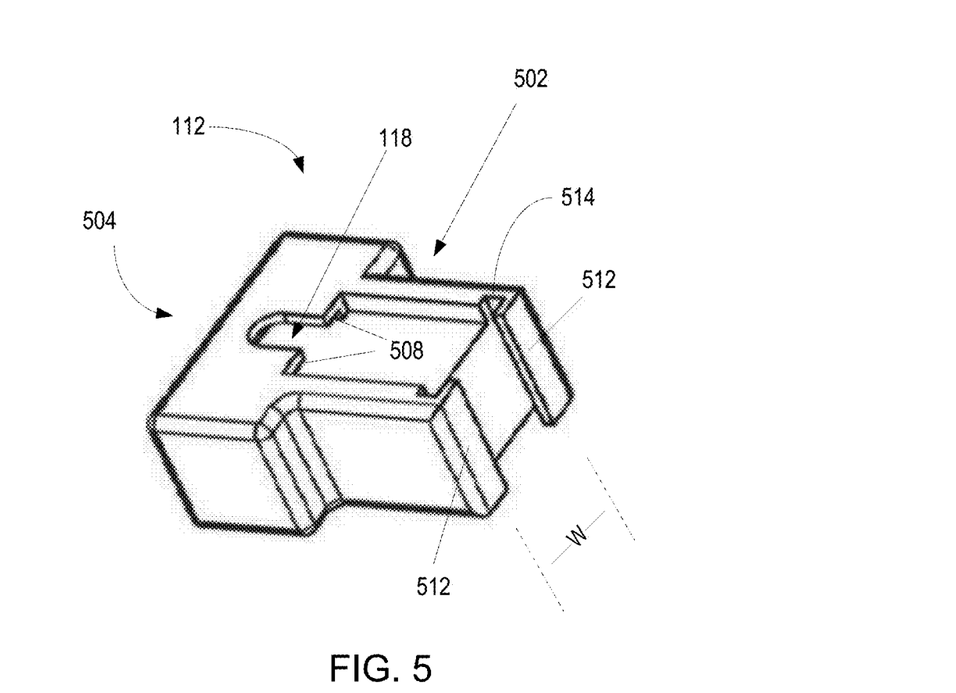
FIG. 5 is a perspective view of an example holder.

FIG. 5 is a perspective view of an example holder 112. The first holder 112 is a first blade holder 112 which includes a blade holder body 502 forming the blade cavity 504 containing the blades 128 (FIGS. 1 & 2). Included on an outer surface of the blade holder body 502 is the slot 118. The slot 118 includes slot ears 508 spaced away from a surface of the blade holder body 112 a predetermined distance to receive a portion of the actuator 114.

Figure 6:
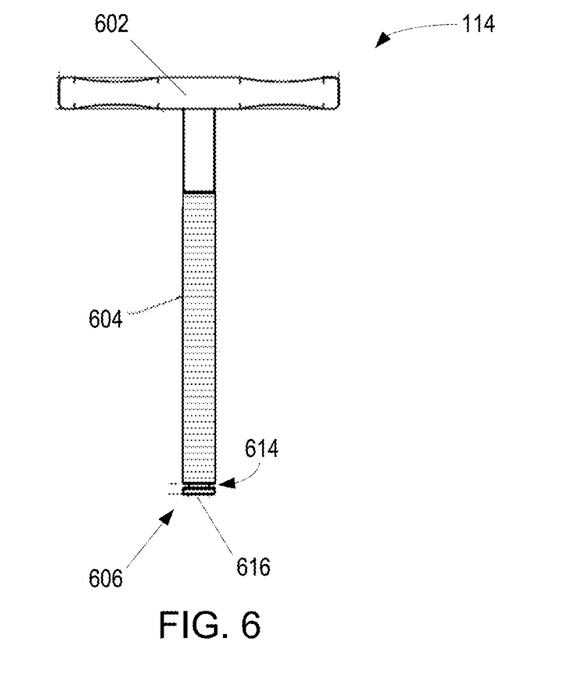
FIG. 6 illustrates an example actuator.

FIG. 6 illustrates an example actuator 114. The actuator 114 includes a handle 602, a shaft 604, and an actuator foot 606. In this example, the actuator 114 is a manual actuator and the handle 602 may be grasped and turned by a user in a clockwise or counterclockwise direction to actuate the first blade holder 112 along the rail 108. The shaft 604 includes threads 610 to engage with threads in the arm aperture 116. The actuator foot 606 may rotatably engage with the slot 118 included on the first blade holder 112.

Referring to FIGS. 5 and 6, the actuator foot 606 includes a channel 614 and a stop 616. The channel 614 is sized to receive the slot ears 508, and the stop 616 is sized for receipt in the predetermined distance the slot ears 508 are spaced away from the surface of the blade holder body 502. Accordingly, when the slot ears 508 are positioned in the channel 614, the stop 616 maintains the actuator 114 rotatably coupled with the first blade holder 112. The channel 614 may circumferentially surround the shaft 604 such that the slot ears 508 remain in the channel 614 in engagement with the actuator 114 as the actuator 114 is rotated. Disengagement of the actuator 114 from the first blade holder 112 may be accomplished by sliding the stop 616 along the surface of the first blade holder 112 out of the slot ears 508.

The blade holder body 502 also includes flanges 512 spaced away from a surface of the blade holder body 502 to form tracks 514. The tracks 514 may be at a predetermined width (W) such that the slide plate 304 may span the predetermined width and be slideably received in the tracks 514. Thus, during actuation of the first blade holder 112 with the actuator 114, the slide plate 304 may hold the first blade holder 112 a fixed distance from the rail 108 while the flanges 512 allow slidably movement of the first blade holder 112 between the first arm 104 and the second arm 106. As best illustrated in FIGS. 3 & 4, the slide plate 304 may also include notches 312. The notches 312 may be sized to allow the flanges 512 (FIG. 5) to disengage from the ears 308 such that the first blade holder 112 may be removed from the tracks 514 (FIG. 5). Removal of the first blade holder 112 from the track 514 and removal of the actuator 114 from the slot 118 allows maintenance of the first blade holder 112, including replacement of the blades 128 (FIGS. 1 & 2).

Figure 7:
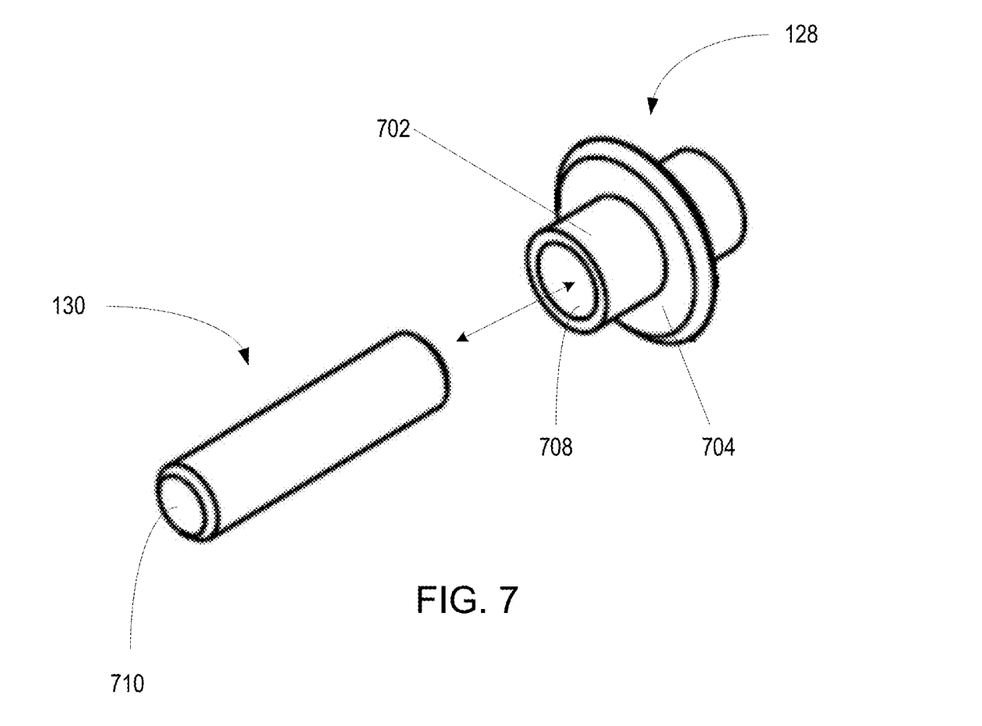
FIG. 7 is a perspective view of a blade and a pin.

FIG. 7 is a perspective view of a blade 128 and pin 130. The blade 128 may include a sleeve 702 and a cutting wheel 704. The sleeve 702 and the cutting wheel 704 may be a rigid material such as hardened carbide steel. The sleeve 702 may include a central aperture 708 sized to receive and surround a portion of the pin 130 such that the cutting wheel 704 is rotatable around the pin 130 and is maintained in position in the first blade holder 112. The pin 130 may include an aperture 710, such as a threaded aperture, sized and designed to receive a mounting screw. The pin 130 may include apertures 710 at opposing ends of the pins 130 such that mounting screws may be threadedly inserted into the respective apertures 710 when the pin 130 is mounted in a blade holder 112 and 120. The screws may extend through the respective blade holders 112 and 120 into the respective pins 130 such that the pins 130 are fixedly held in the respective blade holder 112 and 120. In this example, the pins 130 may be removed for maintenance/replacement of the cutting wheel 704. Alternatively, the pins 130 may be fixedly held in the respective blade holder 112 and 120 by friction fit, welding, wedge fit, or some other permanent or removeable holding mechanism.

Figure 8:
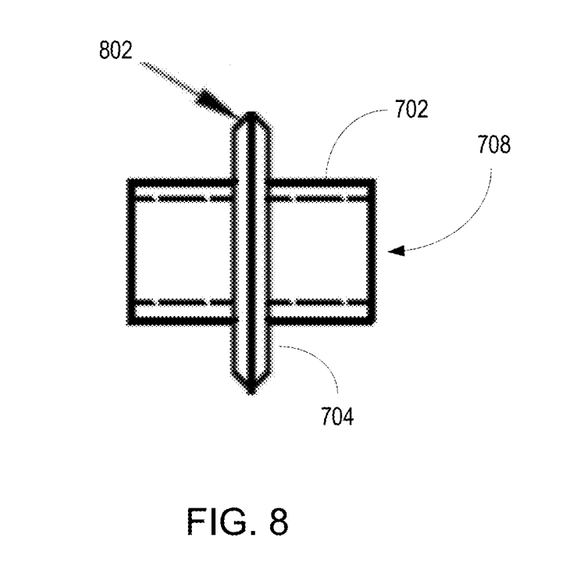
FIG. 8 is another perspective view of the blade of FIG. 7.

FIG. 8 is another perspective view of the blade 128 of FIG. 7. In FIG. 8, the cutting wheel 704 is illustrated as circular disk having a beveled edge 802 as the cutting element. The beveled edge 802 may define the location of the cutting plane 134 provided by the first blade holder 112. As illustrated in FIG. 8, the aperture 708 may extend through the cutting wheel 704 with a uniform predetermined diameter (illustrated with dotted lines) that is larger than the diameter of the pin 130 such that the cutting wheel 704 rotates independent of the pin 130.

Referring again to FIGS. 1 & 2 and 7&8, in the example where the first blade holder 112 and the second holder 120 each include blades 128, the blades 128 of the first blade holder 112 may be aligned in parallel with blades 128 of the second blade holder 120. In addition, the cutting wheels 704 in each of the first blade holder 112 and the second blade holder 120 may be rotatable around respective pins 130 in a direction perpendicular to the first arm 104 and the second arm 106. Thus, the beveled edges 802 of the respective blades 128 may be aligned in the cutting plane 134 on opposite sides of the workpiece 126 to extend towards each other. Alternatively, where the second holder 120 does not include blades, and instead abuts and holds the work piece 126, the blades 128 of the first blade holder 112 may be aligned with and extend toward the second holder 120 while being rotatable around the respective pins 130 in the direction perpendicular to the first arm 104 and the second arm 106. Positioning of the alignment support 138 against the work piece 126 and with respect to the rail 108 determines the location of the cutting plane 134 on the work piece 126.

Figure 9:
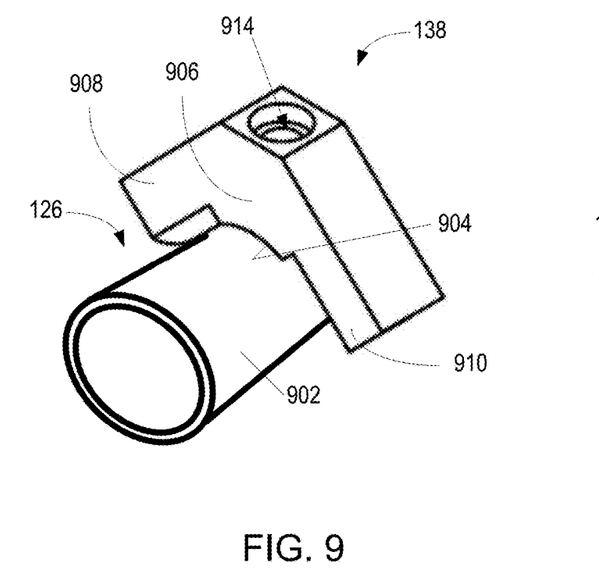
FIG. 9 is a perspective view of an example alignment support.

FIG. 9 is a perspective view of an example of the alignment support 138. In the example of FIG. 9, the alignment support 138 forms a cradle abutting and straddling an outer surface 902 of a work piece 126 along an internal radiused surface 904 of alignment support 138. The internal radiused surface 904 abutting the outer surface 902 may include rollers, a plastic coating, a rubber coating or some other material or device that allows the cutting tool 100 to slide along the length of the work piece 126 during a cutting operation. In this example, the alignment support 138 includes a central area 906, a first guide arm 908 and a second guide arm 910. Once positioned in the radiused surface 904, the work piece 126 is guided to the rest against the central area 906 by the first and second guide arms 908 and 910. In other examples, such as in the example of FIG. 2, the alignment support 138 may include another type of rest in contact with the work piece 126, such as a foot.

Figure 10:
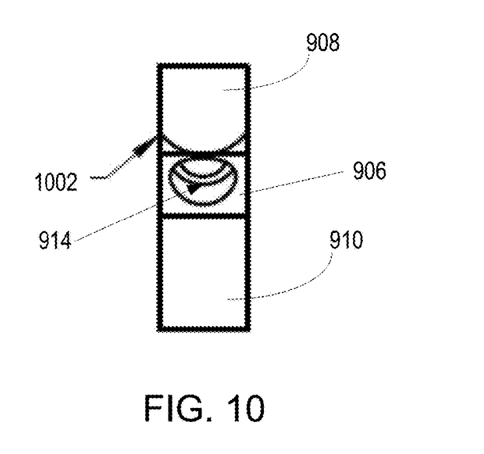
FIG. 10 is an end view of the example alignment support of FIG. 9.

FIG. 10 is an end view of the example alignment support 138 of FIG. 9. As best illustrated in FIG. 10, each of the first and second guide arms 908 and 910 may include alignment edges 1002 such as beveled, chamfered, or rounded edges. The alignment edges may facilitate receipt and proper alignment of the work piece 126 in the internal radiused surface 126. Due the radiused shape, and the first and second guides 908 and 910, when pressing force is applied to the cutting tool 100 in a direction perpendicular to the length direction of the work piece 126, the work piece 126 settles into the alignment support 138 and abuts the central area 906. Thus, the work piece 126 is maintained a predetermined distance from the rail 108 as adjusted by the alignment actuator 140.

Figure 11:
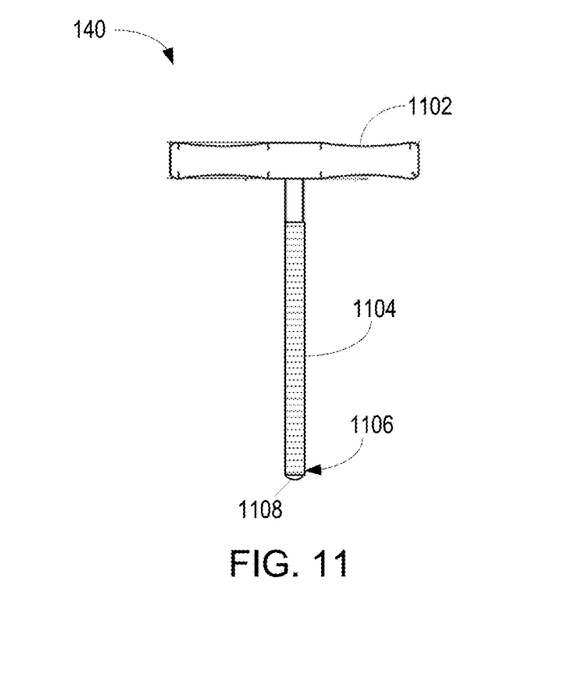
FIG. 11 is an example of an alignment actuator.

FIG. 11 is an example of an alignment actuator 140. The alignment actuator of this example is a manual actuator that is rotated clockwise and counter clockwise by a user using a handle 1102. Referring to FIGS. 3 and 9-11, a threaded shaft 1104 of the alignment actuator 140 may be rotatably engaged with threads in the threaded aperture 302 and with an aperture 914 in the alignment support 138. Thus, the threaded shaft 1104 may extend in parallel with the first and second arms 104 and 106 away from the rail 108. Rotation of the alignment actuator 140 may move the alignment support 138 closer to the rail 108 or farther from the rail 108. In other example, the shaft 1104 and the aperture 302 may not be threaded and may be adjustable with respect to each other by friction, clamping or some other adjustment mechanism. The aperture 914 may be sized to receive an end piece 1106 positioned at the opposite end of the threaded shaft 1104 from the handle 1102. The end piece 1106 may be, for example, a fastener sized to provide a click lock, a snap fit, or any other form of coupling that rigidly couples the alignment actuator 140 with the alignment support 138. The end piece 1106 may be fixedly and rotatably coupled with the alignment support 138, such that the alignment actuator 140 may freely rotate to pull the alignment support 138 closer to the rail 108, or push the alignment support 138 further away from rail 108. In examples, the end piece 1106 may include or be a foot 1108 formed to engage with the work piece. In these examples, the end piece 1106 may be rigidly coupled with the shaft 1104 such that movement, such as rotation, of the shaft 1104 causes the foot 1108 to slide on the surface of the work piece. Alternatively, or in addition, the end piece 1106 may include a foot 1108 rotatably coupled with the shaft 1104 such that the foot 1108 and the threaded shaft 1104 are coupled and independently moveable. In still other examples, the end piece 1106 may be a rounded end of the shaft 1104 formed as part of the unitary monolithic structure of the shaft 1104.

Since the blades 128 are spaced a predetermined distance away from the rail 108, movement of the alignment support 138 may adjust the location of the cutting plane 134 with respect to the work piece 126 by changing the location on the work piece 126 where the blades 128 engage and roll along the length of the work piece 126.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A longitudinal pipe cutting tool comprising:
   a main body having a first arm, a second arm and a rail extending transversely between the first arm and the second arm such that the first arm and the second arm are aligned and extend away from the rail in a same direction at opposite ends of the rail;
   a first holder movably mounted on the rail to move along the rail between the first arm and the second arm;
   a first plurality of blades mounted in the first holder, each blade on a respective pin coupled with the first holder, the blades comprising cutting wheels, each cutting wheel being rotatable around an axis of each respective pin and defining a first cutting plane, the first cutting plane being in a direction perpendicular to the direction the first arm and the second arm extend away from the rail;
   an alignment support coupled with the rail and moveably extending between the first arm and the second arm and in parallel with the first arm and the second arm and perpendicular to the first cutting plane, the alignment support configured to abut a work piece positioned between the first arm and the second arm; and
   a second holder engageable with the work piece longitudinally extending away from the second holder, the second holder being positioned such that the first plurality of blades mounted in the first holder are aligned with and extend toward the second holder, and a direction of rotation of the first plurality of blades is along the work piece longitudinally extending away from the second holder;
   wherein the second holder comprises a second plurality of blades mounted in the second holder, each blade on a respective pin coupled with the second holder, the second plurality of blades comprising cutting wheels, each cutting wheel being rotatable around an axis of each respective pin and defining a second cutting plane in the direction perpendicular to the first arm and the second arm, wherein the second cutting plane is parallel with the first plurality of blades mounted in the first holder.

2. The longitudinal pipe cutting tool of claim 1, wherein the first holder and the second holder are movably mounted on the rail such that the first plurality of blades mounted in the first holder are aligned parallel with the second plurality of blades mounted in the second holder.

3. The longitudinal pipe cutting tool of claim 1, wherein the second holder is a stationary holder fixedly mounted on the first arm or the second arm or fixedly mounted on the rail between the first holder movably mounted on the rail and one of the first arm or the second arm.

4. The longitudinal pipe cutting tool of claim 1, further comprising an actuator coupled to the first arm and abutting the first holder opposite the blades to movably hold the first holder in a stationary position with respect to the rail.

5. The longitudinal pipe cutting tool of claim 4, wherein the actuator is threaded and disposed in a threaded aperture in the first arm, and the actuator is rotatable in the threaded aperture in a first direction to move the first holder linearly towards the first arm and the actuator is rotatable in the threaded aperture in a second direction to move the first holder linearly away from the first arm.

6. The longitudinal pipe cutting tool of claim 1, further comprising an alignment actuator coupling the alignment support with the rail, the alignment support movable away from the rail, or toward the rail according to adjustment of the alignment actuator.

7. The longitudinal pipe cutting tool of claim 1, wherein the rail comprises a track extending along the rail and the first holder comprises a flange, wherein the flange is engaged with the track such that first holder movably slides along rail with the flange maintained in engagement with the track.

8. A longitudinal pipe cutting tool comprising:
a body having a first end and a second end that are at opposite ends of the body;
a first holder comprising a first cutting wheel rotatable in a first cutting plane along a longitudinal direction of a work piece, the first holder being moveably coupled with a first arm at the first end of the body;
a second holder comprising a second cutting wheel rotatable in a second cutting plane along the longitudinal direction of the work piece, the second holder being moveably coupled with a second arm at the second end of the body;
a first actuator coupling the first holder with the first arm;
a second actuator coupling the second holder with the second arm;
the first and second actuators configured to move independently the first and second holders toward or away from the work piece disposed between the first and second holders, wherein the first and second holders are slideably coupled with the body; and
an alignment support coupled with the body by an alignment actuator, the alignment support configured to abut the work piece and align the work piece with respect to the first and second cutting wheels, and the alignment support movable by the alignment actuator in a direction perpendicular to the first or second cutting plane to adjust the location that the first and second cutting planes intersect the work piece.

9. The longitudinal pipe cutting tool of claim 8, wherein the first cutting wheel of the first holder and the second cutting wheel of the second holder are aligned such that the cutting wheel of the first holder and the cutting wheel of the second holder cut opposite sides of the work piece in substantially the same cutting plane.

10. A longitudinal pipe cutting tool comprising:
a first cutting wheel rotatably disposed in a first holder to rotate around a first pin;
a second cutting wheel rotatably disposed in a second holder to rotate around a second pin; and
a body comprising a rail, a first end and an opposite second end, a first member extending from the first end of the body, a second member extending from the second opposite end of the body, and two lips on opposite sides of the rail extending along a portion of a length of the rail between the first member and the second member, each of the lips extending beyond a respective opposite side of the rail;
wherein one side of the first holder and the second holder are slideably coupled with the two lips and disposed between the first member and the second member such that a work piece may be positioned between the first holder and the second holder;
wherein the first holder is slidable on the rail between the first member and the second member to contiguously contact the work piece with the first cutting wheel and the second cutting wheel, the work piece having a length and a width, the length longitudinally extending perpendicular to the first pin and the second pin such that the first and second cutting wheels are rotatable along the length of the work piece.

11. The longitudinal cutting tool of claim 10, wherein at least one of the first cutting wheel or the second cutting wheel comprises a plurality of cutting wheels sequentially aligned in the respective first or second holder to provide a cutting plane extending along the length of the work piece.

12. The longitudinal cutting tool of claim 10, further comprising an actuator coupled with one of the first member or the second member and at least one of the first holder or the second holder, and an alignment support coupled with the rail and extending parallel to at least one of the first pin or the second pin to contiguously contact and align the work piece with the first cutting wheel and the second cutting wheel.

13. The longitudinal cutting tool of claim 10, wherein the first holder and the second holder are configured to be positioned on opposite sides of the work piece.

* * * * *